(12) United States Patent
Beichl et al.

(10) Patent No.: US 7,862,047 B2
(45) Date of Patent: Jan. 4, 2011

(54) APPARATUS AND METHOD FOR SEALING OFF COMPONENTS WITH RESPECT TO A PRESSURE DIFFERENCE REVERSAL

(75) Inventors: Stefan Beichl, Herrsching (DE); Carsten Butz, Munich (DE); Christoph Cernay, Bruckmuehl (DE)

(73) Assignee: MTU Aero Engines GmbH, Munich (DE)

( * ) Notice: Subject to any disclaimer, the term of this patent is extended or adjusted under 35 U.S.C. 154(b) by 0 days.

(21) Appl. No.: 12/253,653

(22) Filed: Oct. 17, 2008

(65) Prior Publication Data
US 2009/0039604 A1 Feb. 12, 2009

Related U.S. Application Data

(62) Division of application No. 10/559,315, filed as application No. PCT/DE2004/000863 on Apr. 24, 2004, now abandoned.

(30) Foreign Application Priority Data
May 30, 2003 (DE) ................ 103 24 709

(51) Int. Cl.
*F16J 15/44* (2006.01)
(52) U.S. Cl. .................................. 277/355
(58) Field of Classification Search .......... 277/355, 277/412
See application file for complete search history.

(56) References Cited

U.S. PATENT DOCUMENTS

| 885,032 | A | | 4/1908 | Ferranti | |
|---|---|---|---|---|---|
| 4,924,817 | A | * | 5/1990 | Seelen | 122/379 |
| 5,090,710 | A | * | 2/1992 | Flower | 277/355 |
| 6,120,622 | A | * | 9/2000 | Mayr et al. | 148/516 |
| 6,308,957 | B1 | * | 10/2001 | Wright | 277/355 |
| 6,328,311 | B1 | * | 12/2001 | Plona et al. | 277/355 |
| 6,669,202 | B1 | | 12/2003 | Aksit et al. | |
| 6,779,799 | B2 | * | 8/2004 | Tong et al. | 277/411 |
| 7,458,584 | B2 | * | 12/2008 | Addis | 277/355 |
| 2004/0000760 | A1 | * | 1/2004 | Aksit et al. | 277/355 |
| 2004/0100030 | A1 | | 5/2004 | Addis | |
| 2004/0119237 | A1 | | 6/2004 | Datta | |
| 2004/0256807 | A1 | | 12/2004 | Bhate et al. | |

FOREIGN PATENT DOCUMENTS

| DE | 39 07 614 A1 | 9/1990 |
|---|---|---|
| DE | 196 28 559 A1 | 1/1998 |
| DE | 197 20 648 A1 | 11/1998 |
| DE | 197 20 649 A1 | 11/1998 |
| DE | 100 18 273 A1 | 10/2001 |
| WO | WO 01/13013 A1 | 2/2001 |

OTHER PUBLICATIONS

PCT/DE2004/000863 PCT/ISA/210.

* cited by examiner

*Primary Examiner*—Vishal Patel
(74) *Attorney, Agent, or Firm*—Crowell & Moring LLP

(57) ABSTRACT

A brush seal for sealing off components movable relative to one another with respect to a pressure difference is disclosed. The brush seal having bristles which are arranged in a bristle housing which consists of two housing halves having free ends of legs which project into the area of the ends of the bristles, which legs carry mutually facing supporting surfaces for the bristles.

4 Claims, 1 Drawing Sheet

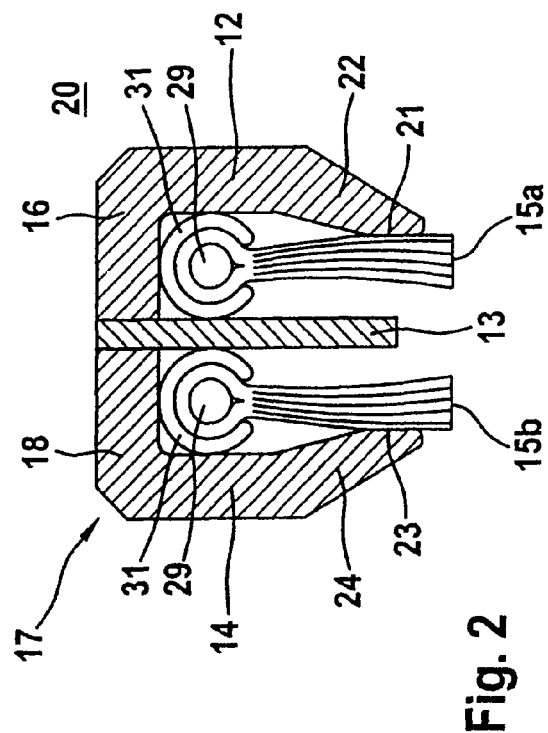
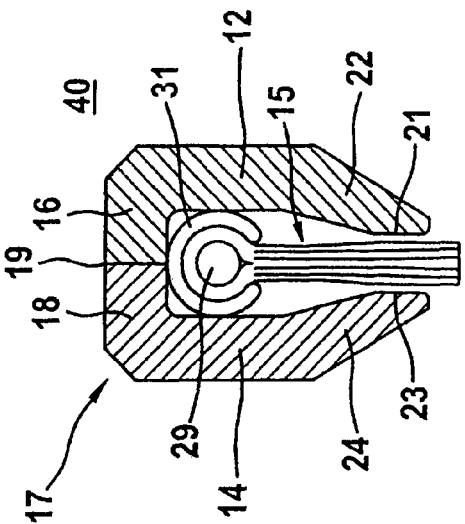
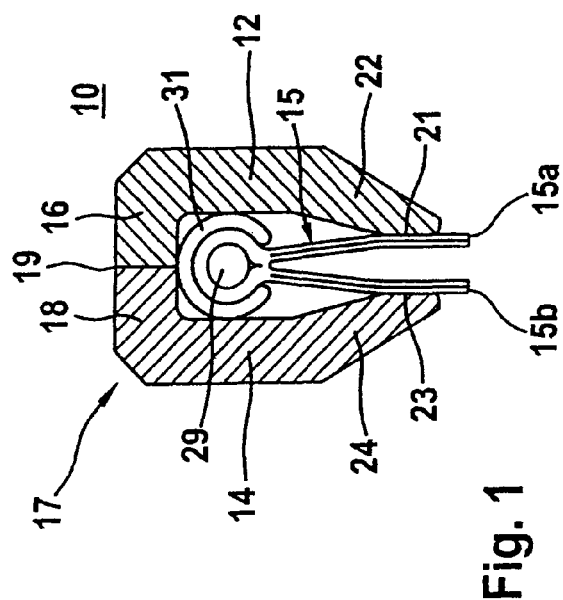
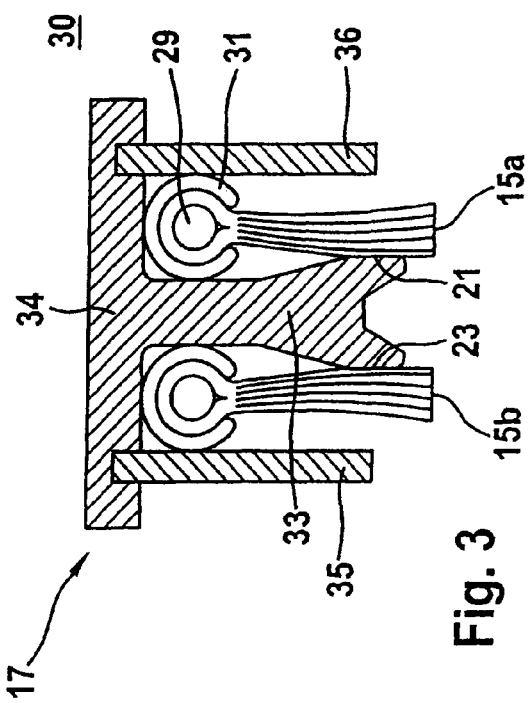
Fig. 1
Fig. 2
Fig. 3
Fig. 4

APPARATUS AND METHOD FOR SEALING OFF COMPONENTS WITH RESPECT TO A PRESSURE DIFFERENCE REVERSAL

This application is a divisional of U.S. application Ser. No. 10/559,315, which was the National Stage of International Application No. PCT/DE2004/000863, filed Apr. 24, 2004, the disclosures of which are expressly incorporated by reference herein.

BACKGROUND AND SUMMARY OF THE INVENTION

The invention relates to a brush seal for sealing off components movable relative to one another with respect to a pressure difference, having bristles to which a supporting surface is assigned against which the bristles come to rest which are deflected to the side of the lower pressure.

The use of brush seals for sealing off components, which can be moved relative to one another and, in particular, are rotationally movable, with respect to a pressure difference are sufficiently known. Such brush seals comprise essentially a bristle housing which is disposed in a component of the arrangement to be sealed off and is used for accommodating the bristles. In this case, the bristles are oriented with their free ends toward a sealing surface of the second component of the arrangement to be sealed off and, with respect to the pressure difference to be sealed off, can be supported on a supporting plate arranged in the bristle housing. The cover plate and the supporting plate of the bristle housing are connected with one another and are disposed within a corresponding recess in the first component on the correct side; compare German Patent Document DE 100 18 273 A1.

All brush seals known so far have the common disadvantage that they can be used only for a pressure difference in one direction. However, in industrial applications, a pressure reversal may occur so that the brush seal also has to be effective in the opposite pressure direction. Similar requirements also occur in the case of bearing chamber seals in aircraft engines when no reliable admission of sealing air takes place to the seal under certain operating conditions, for example, below an idling rotational speed.

It is therefore an object of the invention to provide a remedy here by a construction of the bristle housing which permits the use of one and the same brush seal independently of the direction of the pressure difference.

Based on a brush seal of the initially mentioned type, this object according to the invention is achieved in that a bristle housing with one or more bundles of bristles and with at least two surfaces supporting in opposite directions is provided for the purpose of sealing off the components also in the case of a change of the pressure direction.

According to a first embodiment of the invention, the bristle housing consists of two opposite, particularly symmetrically arranged and mutually identical housing halves with legs projecting into the area of the bristle ends, the free ends of the legs having mutually facing supporting surfaces for the bristles.

According to another embodiment of the invention, two bundles of bristles, which are kept separate, are arranged in a bristle housing with two opposite, particularly symmetrically arranged and mutually identical housing halves whose legs have supporting surfaces for the bundles of bristles, if required, with a separating plate between the bundles of bristles.

According to another embodiment of the invention, the bristle housing comprising the bundles of bristles has a formation with a T-like cross-section which has a central leg whose foot area forms opposite supporting surfaces for the bundles of bristles, which are held between plates and the central leg, which plates engage in the leg halves of a leg situated transversely with respect to the central leg.

Finally, it is also conceivable to divide the bristles held by the bristle housing into two bundles of bristles which are assigned to oppositely acting pressure differences and adjoin one another.

By means of the design of the new brush seal according to the invention, it is ensured that there are always bristles which rest against the respective supporting surface in the correct pressure direction. Particularly when the brush seal according to the invention is used as a bearing chamber seal for aircraft engines, this means that a housing ring on the low-pressure side acts as a supporting ring and a housing ring on the high-pressure side operates as a cover ring.

In the last-mentioned preferred embodiment, a bundle of bristles securely comes to rest on the respective supporting surface only starting at a certain pressure difference, so that the full sealing effect is reached only starting at such a pressure difference. However, even this type of an embodiment has a sealing effect which is independent of the direction of the pressure difference.

BRIEF DESCRIPTION OF THE DRAWINGS

In the following, the invention will be described by means of four embodiments more or less schematically illustrated in the drawings.

FIG. 1 is a sectional view of the arrangement of a brush seal of the invention according to a first embodiment of the invention;

FIG. 2 is a view of a second embodiment of a brush seal according to the invention;

FIG. 3 is a view of a third embodiment of a brush seal according to the invention; and FIG. 4 is a view of a fourth embodiment of a brush seal according to the invention.

DETAILED DESCRIPTION OF THE DRAWINGS

A brush seal, which, as a whole, has the reference number 10 in FIG. 1, for sealing off a gap between two components of a turbo-engine, for example, of a gas turbine of an aircraft engine or the like, which can be moved relative to one another, comprises two identical mirror-inverted housing halves 12 and 14 forming a housing 17 comprising bristles 15. Each housing half 12 and 14 constructed in a j-shape rests by means of the face of its short legs 16 and 18 respectively against the adjacent housing half at reference number 19 in a plane manner. The long legs 22, 24 of the housing halves 12 and 14 of the housing 17 taper here in their end regions; with respect to the not deflected bristles 15, these legs 22, 24 are inclined toward these bristles and carry mutually facing supporting surfaces 21 and 23 for the bristles 15.

The bristles 15 are laid around a core wire and are held in a frictionally engaged manner in their position by an adapter sleeve 31, the arrangement according to FIG. 1 being such that the bristles 15 are held in a divided manner as a partial bundle 15a and a partial bundle 15b. As illustrated in FIG. 1, the adapter sleeve 31 is fixed between the housing halves 12 and 14 of the bristle housing 17 while resting against their short legs.

As a result of the above-described construction of the bristle housing and the bristle bundles, such an operating performance of the brush seal is achieved in that, as a function of the direction of the respectively existing pressure difference, the bristles, while being in each case deflected in the direction of the lower pressure, are placed against the supporting surface 21 or 23 of the housing halves 12 and 14 so that, in the event of a pressure reversal, a reliable sealing-off of the sealing gap takes place.

In the embodiment of a brush seal 20 according to FIG. 2, the components of the bristle housing 17 which correspond to FIG. 1 have the same reference numbers. A separating plate 13 is clamped in between the housing halves 12 and 14, so that a core wire 29 and an adapter sleeve 31 are provided for each of the mutually separated bristle bundles 15*a*, 15*b* and are held in the position within the bristle housing 17 illustrated in FIG. 2.

There also, the long legs 22 and 24 of the housing halves 12 and 14 have surfaces 21 and 23 which are inclined toward the bundles of bristles and which are used as supporting surfaces for the bundles of bristles 15*a* and 15*b* which are in each case deflected to the side of the respective lower pressure.

In the embodiment of a brush seal 30 according to FIG. 3, the bristle housing 17 has a construction with a T-like cross-section with a central leg 33 and a leg 34 which is situated perpendicularly thereto. A core wire 29 and an adapter sleeve 31 are in each case also assigned to each bundle of bristles 15*a* and 15*b*. The adapter sleeves 31 holding the bundles of bristles are held in their position illustrated in FIG. 3 by means of plates 35 and 36 engaging in the leg halves of the leg 34 situated in a horizontal position in this case. The surfaces 21 and 23 situated opposite one another in the foot area of the leg 33 which is perpendicular here form the supporting surfaces for the bristle bundles 15*a* and 15*b*, so that also there the bristles of the bristle bundles, while in each case being deflected to the side of the lower pressure, can come to rest against the assigned supporting surface during the operation.

The brush seal 40 according to the embodiment of FIG. 4, corresponds to the brush seal 10 according to the embodiment of FIG. 1. The difference is, however, that the bristles 15 are held in an undivided manner over the core wire 29 by the adapter sleeve 31 and are situated in the center in the gap bounded by the supporting surfaces 21 and 23 of the housing 17. There also, during the operation, the bristles, which are in each case deflected to the side of the lower pressure, can come to rest against the surfaces 21 or 23 serving as the supporting surfaces.

What is claimed is:

1. A brush seal for sealing off components movable relative to one another with respect to a reversible pressure difference, comprising:

a bristle housing; and bristles engaged in the bristle housing;

wherein the bristles are included in a first bundle and a second bundle and the bristle housing includes a first housing half and a second housing half divided by a separating plate, wherein the first bundle is engaged in the first housing half and the second bundle is engaged in the second housing half;

wherein the first housing half has a first leg with a first supporting surface and the second housing half has a second leg with a second supporting surface, wherein the first and second legs are inclined toward the separating plate, and wherein the first and second supporting surfaces are located at respective distal ends of the first and second legs and have a different angle of inclination than respective surfaces of the first and second legs;

and wherein, in an operational configuration, when a pressure difference in a gap between the components is in a first direction, the first bundle engages with only the first supporting surface to seal the gap between the components and wherein when the pressure difference in the gap is in a second direction, which second direction is opposite the first direction, the second bundle engages with only the second supporting surface to seal the gap between the components.

2. The brush seal according to claim 1, wherein the first bundle is disposed between the separating plate and the first leg and wherein the second bundle is disposed between the separating plate and the second leg.

3. The brush seal according to claim 1, wherein the first supporting surface located at the distal end of the first leg is parallel to a surface of the separating plate and wherein the second supporting surface located at the distal end of the second leg is parallel to the surface of the separating plate.

4. The brush seal according to claim 1, wherein the first supporting surface located at the distal end of the first leg is parallel to a surface of the first housing half that is disposed above the first leg and wherein the second supporting surface located at the distal end of the second leg is parallel to a surface of the second housing half that is disposed above the second leg.

* * * * *